(No Model.)

H. S. MALTBY.
ADJUSTABLE BUTTER MOLD.

No. 524,147. Patented Aug. 7, 1894.

Witnesses:

Inventor
Herbert S. Maltby

UNITED STATES PATENT OFFICE.

HERBERT SANFORD MALTBY, OF CLARKSVILLE, CALIFORNIA.

ADJUSTABLE BUTTER-MOLD.

SPECIFICATION forming part of Letters Patent No. 524,147, dated August 7, 1894.

Application filed April 16, 1894. Serial No. 507,749. (No model.)

*To all whom it may concern:*

Be it known that I, HERBERT SANFORD MALTBY, a citizen of the United States, residing at Clarksville, Eldorado county, State of California, have invented an Improvement in Adjustable Butter-Molds; and I hereby declare the following to be a full, clear, and exact description of the same.

My invention relates to the class of butter molds, and it consists essentially in adjustably connecting the sections of the mold whereby its capacity can be regulated to any required weight.

The object of the invention is to provide dairymen with a mold by which it is possible to compensate for difference in weight, dependent upon changes in temperature and upon the swelling of the mold. It is well known that rolls or squares of butter, when made by the same mold, will vary in weight with a change of temperature. The dairymen, in order to fill orders for rolls or squares of given weights, have often to buy new molds and cut them to the right size. This is a difficult matter and generally they have to be cut two or three times before they are right, and then a change in temperature or a swelling of the mold is liable to spoil the work. Sometimes, also, the law provides for rolls or squares of uniform weight.

By my invention the dairyman can cut his mold to the right size, and then by means of its adjustability can accurately compensate for the changes due to temperature and swelling.

Figure 1:
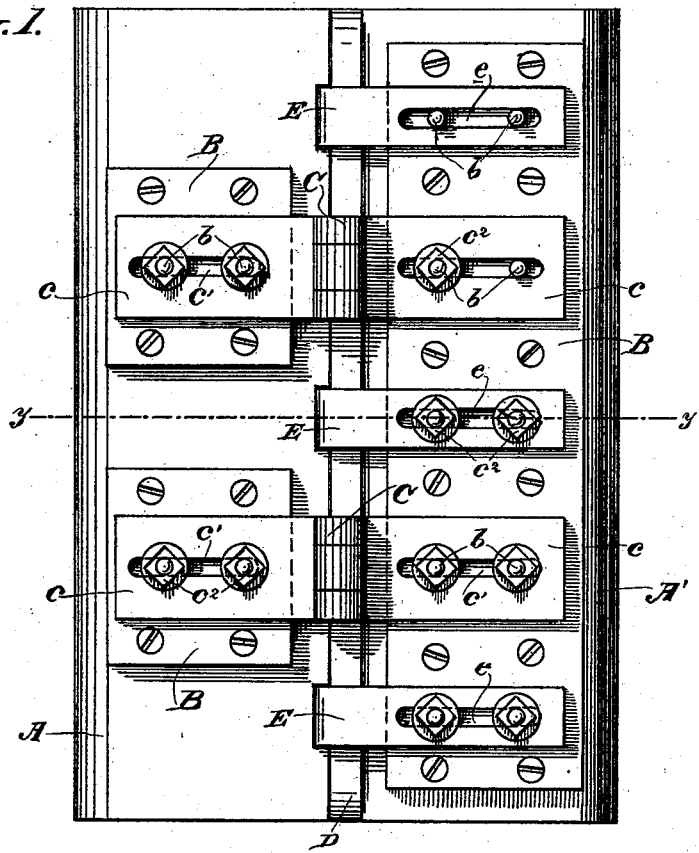
Figure 2:
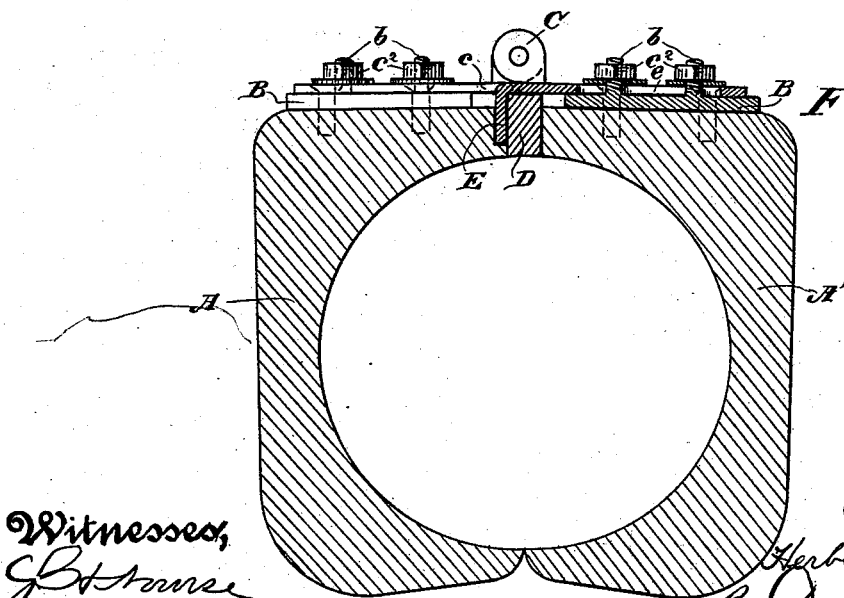

Referring to the accompanying drawings for a more complete explanation of my invention,—Figure 1 is a view of the back of my mold. Fig. 2 is a cross section on line $y$—$y$ of Fig. 1.

The butter mold is made of the usual sections A A'. These are connected adjustably by hinges whereby the sections may be moved closer together or farther apart. The adjustment may be accomplished in any suitable manner, preferably, as here shown, by providing for the sliding and fixing of the lap plates of the hinges which may take place in various ways. But the best way, and one which will enable the dairyman to readily apply his hinges to any mold, whereby he may use them successively and indiscriminately upon molds of different sizes as required, is that here shown in which plates B are screwed to each section, and upon which the lap plates $c$ of the hinges C are fitted and adapted to slide.

From the plates B, rise short bolts or threaded studs $b$ which pass freely through elongated slots $c'$ in the lap plates $c$, and receive nuts $c^2$ on their upper ends. Now, it will readily be seen that by loosening the nuts $c^2$, the lap plates of the hinges may be drawn out or pushed in, thus separating the mold sections or forcing them closer together. Then by tightening the nuts $c^2$, the lap plates will be held and will hold the mold sections at the point at which they have been adjusted.

When the mold sections are spread apart, it is obvious that a crack or space will be left between their adjacent hinged edges, where they should meet, in order to produce a perfect roll or square of butter. This crack is filled by one or more narrow strips D which are held by catches E adjustably fastened at intervals to the mold. The adjustable connection of these catches is similar to that of the lap plates and consists of elongated slots $e$ in the bodies of the catches which play over the short bolts $b$ in the plate B, said catches being secured by nuts $c^2$. Thus the catches are adapted to receive and secure filling strips of different thicknesses as required by the width of the crack.

Though I have here illustrated a mold for a roll of butter, it is obvious that the invention is applicable as well to a mold for producing squares.

With this mold, or with the hinges and their appurtenances, to be applied to any mold, a dairyman wanting a roll or square of perfect shape and given weight, can cut his mold to the right size and then by applying the hinges can be prepared to compensate for changes of temperature and swelling of the mold.

Having thus described my invention, what I claim as new, and desire to secure by Letters Patent, is—

1. A butter mold the sections of which are adjustably connected to their hinges whereby they may be separated or brought closer together, and an adjustably connected filling strip for the space between the hinged edges of said sections, substantially as described.

2. A butter mold, the sections of which are adjustably connected to their hinges, a filling strip between the hinged edges of the sections and adjustable catches for supporting said strip, substantially as described.

3. The butter mold sections, in combination with the hinges uniting them, a sliding connection between the lap plates of the hinges, and sections and means for closing the space between the sections when the latter are separated, substantially as described.

4. In combination with the sections of a butter mold, the plates B secured to said sections, the hinges having the slotted lap plates seated on said plates B and slidable over bolts or studs therein, the nuts on the bolts or studs for fixing the parts where adjusted, and means for closing the space between the sections when the latter are separated substantially as described.

5. In combination with the sections of a butter mold the plates B secured to said sections, the hinges having the slotted lap plates seated on said plates B and slidable over bolts or studs therein, and the nuts on the bolts or studs for fixing the parts where adjusted, the slotted catches seated on one of said plates B and slidable over bolts or studs therein, nuts for holding said catches and a filling strip supported by the catches and lying in the crack between the hinged edges of the mold sections, substantially as herein described.

In witness whereof I have hereunto set my hand.

HERBERT SANFORD MALTBY.

Witnesses:
JOSEPH JOERGER,
J. F. WRIGHT.